United States Patent Office 2,694,742
Patented Nov. 16, 1954

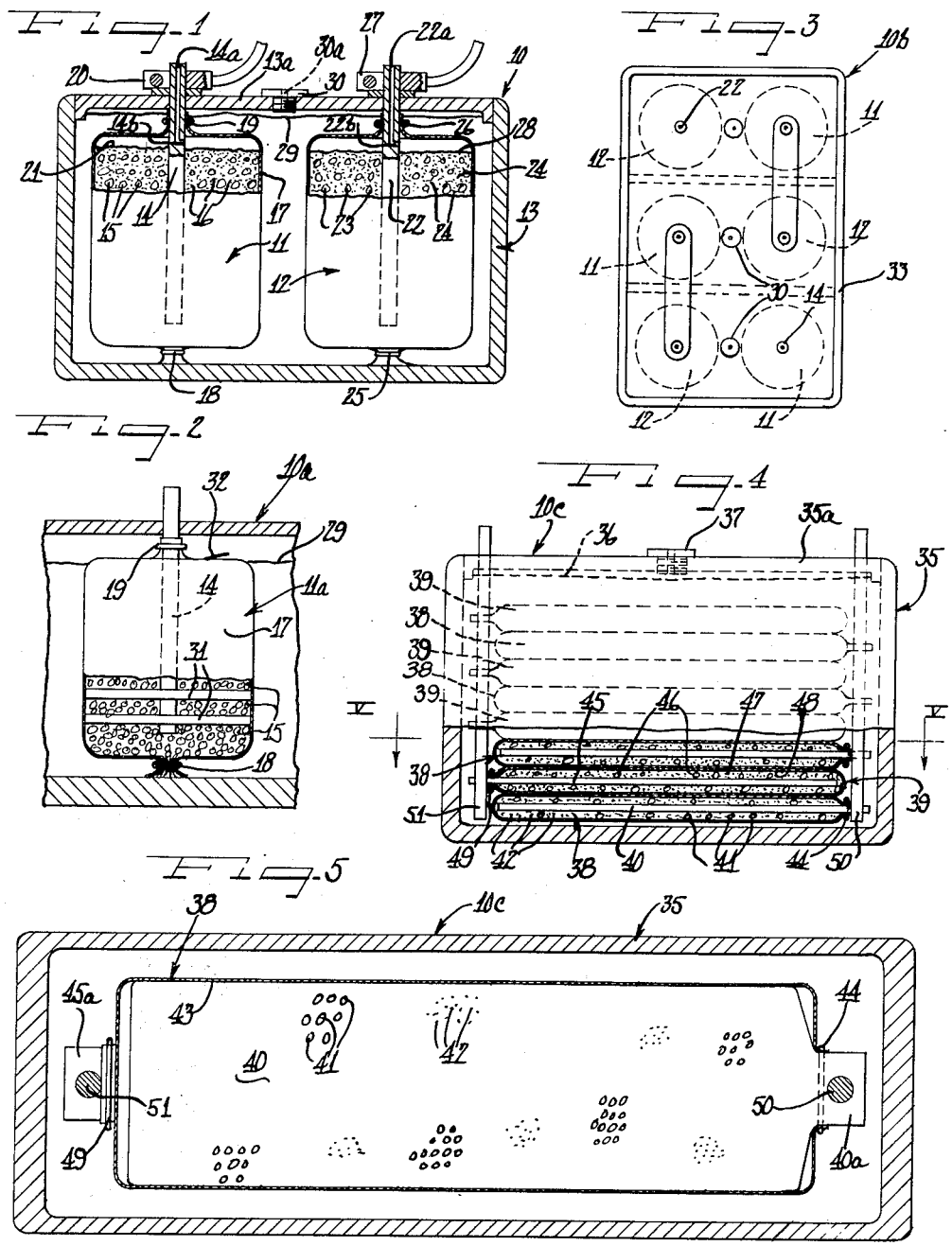

2,694,742
BATTERY

Magnus S. Harding, Madison, Wis.

Application May 11, 1953, Serial No. 354,038

12 Claims. (Cl. 136—6)

This invention relates to a storage battery or accumulator which is free from metal parts, light in weight, and operates by selective adsorption of ions. Specifically, this invention relates to a storage battery having a positive cell composed of a carbon electrode surrounded by a cation exchange resin and enclosed in an ionically permeable container, a negative cell composed of a carbon electrode surrounded by an anion exchange resin and enclosed in an ionically permeable container together with a metal hydroxide solution in the positive cell, an acid solution in the negative cell, and a salt solution surrounding the cells composed of the positive cell anion and the negative cell cation.

Heretofore, storage batteries or secondary cells of only two types have been commercially successful, namely, the lead accumulator and the iron accumulator. Both of these accumulators include metal plates and highly corrosive electrolytes. As a result, they are heavy, subject to deterioration due to corrosion, and require expensive plate constructions and corrosion-resisting containers.

The present invention now provides storage batteries or accumulators which are inexpensive, stable, light in weight, have a long life, and will quickly recharge. The accumulators of this invention are free from active metal parts and operate on an ion exchange principle to develop about the same potential as the aforementioned heretofore used commercial accumulators. The accumulators of this invention are free from open or exposed corrosive solutions since the only exposed electrolyte is a neutral aqueous salt solution preferably concentrated close to saturation although moderately dilute solutions are operative. Anti-freeze properties are provided by the saline solutions and these properties can be enhanced by incorporation of non-freezing alcohols, glycerine or the like.

It is then an object of this invention to provide a secondary cell or storage battery consisting of basic positive and negative cells each containing an ion exchange resin, an electrode, an aqueous acid solution and an aqueous hydroxide solution respectively, and being immersed in an aqueous salt solution containing the salt of the positive cell anion and the negative cell cation.

A further object of this invention is to provide an ion exchange storage battery having a positive cell consisting of a central carbon electrode surrounded by a cation exchange resin and encased in an ionically permeable container, a negative cell consisting of a central carbon electrode surrounded by an anion exchange resin and encased in an ionically permeable container with both cells being immersed in a salt solution and with the positive cell containing a metallic hydroxide of the same metal as the salt and with the negative cell containing a soluble acid, the cation of which is the same as the cation of the salt.

A further specific object of this invention is to provide a metal-free storage battery.

A further object of this invention is to provide an ion exchange storage battery composed of a plurality of positive and negative cells each housed in a permeable container such as regenerated cellulose, porcelain or the like, and with each of the cells immersed in a common salt solution.

Other and further objects of the invention will be apparent to those skilled in the art from the following detailed description of the annexed sheet of drawings which, by way of preferred examples, illustrate several embodiments of the invention.

On the drawings:

Figure 1 is a vertical cross-sectional view of one form of storage battery according to this invention and illustrating parts in elevation.

Figure 2 is a fragmentary view similar to Figure 1 but illustrating another form of electrode for one of the cells of the battery.

Figure 3 is a plan view of the battery illustrating the manner in which the cells can be connected to increase the voltage.

Figure 4 is a cross-sectional view of another form of battery according to this invention illustrating flat cells in superimposed relation.

Figure 5 is a horizontal cross-sectional view taken along the line V—V of Figure 4.

As shown on the drawings:

The storage battery 10 of Figure 1 includes a positive cell 11, a negative cell 12, and a liquid-tight container or box 13. The positive cell 11 is composed of a central carbon electrode 14, illustrated in the form of a rod. Granules 15 of a cation exchange resin surround the electrode 14 and finely divided carbon particles 16 composed of powdered carbon or graphite are intermixed with the resin particles 15 to increase the effective volume of the electrode rod 14. The particles 15 and 16 are enclosed and confined by a chemically non-reacting ionically permeable container 17 which, as illustrated, is in the form of a seamless regenerated cellulose tube tied closed at the bottom as at 18 and tied around the top of the electrode as at 19. The electrode 14 has an axial bore 14a extending inwardly from the top end thereof to a transverse bore 14b communicating with the top portion of the cell 11 for venting the cell to the atmosphere. As illustrated, the electrode 13 projects above the top 13a of the container 13 and a conductor clamp 20 is secured around the exposed top of the electrode. The cell 11 is filled to a level beneath the transverse bore 14b with an aqueous metallic hydroxide solution 21 preferably concentrated, although dilute solutions are operative.

The negative cell consists of a central carbon electrode rod 22 similar to the rod 14, anion exchange resin particles 23 surrounding the rod and interspersed with finely divided graphite or carbon particles 24. The particles 23 and 24 are housed within a chemically non-reacting ionically permeable container which, as illustrated, is in the form of a seamless regenerated cellulose tubing tied closed at the bottom as at 25 and tied around the top portion of the electrode as at 26. The electrode has an axial bore 22a extending from the top thereof and merging with a transverse bore 22b venting the top portion of the cell 12 to the atmosphere. An electrode clamp 27 surrounds the top portion of the electrode above the top wall 13a of the container 13. The cell 12 is filled to a level beneath the transverse bore 22b with an aqueous acid solution 28 preferably concentrated although dilute solutions are operative.

The cells 11 and 12 are immersed in an aqueous salt solution 29 preferably concentrated, in the container 13 and the top wall 13a has a filling plug 30 threaded therein to replenish the salt solution. The plug 30 can be vented at 30a to permit the solution to be vented to the atmosphere.

The cation exchange resin in the positive cell 11 can be any one of the relatively large number of available cation exchangers such as, for example, the following trade-marked exchangers manufactured by the listed companies:

| Trade Name | Type | Manufacturer and Location |
|---|---|---|
| Alkalex | Carboxylic type from alkaline oxidation of coal. | Research Products Corp. Madison, Wisconsin. |
| Amberlite IR-120 | Sulfonated polystyrene divinyl benzene copolymer. | Rohm & Haas Company, Philadelphia, Pa. |
| Catex | Sulfonated coal | Infilco Inc., Chicago, Illinois. |
| Crystalite | Sodium alumino-silicate. | Infilco Inc., Chicago, Illinois. |
| Decalso | | The Permutit Company, New York, N. Y. |
| Dowex | Phenol sulfonic acid formaldehyde type resin. | The Dow Chemical Co., Midland, Michigan. |
| Liquonex CGH | Stabilized glauconite | Liquid Conditioning Corp., Linden, N. J. |
| Refinite ZN | Processed zeolite clay foam bentonites. | The Refinite Corp., Omaha, Nebraska. |

The anion exchange resin in the negative cell 12 can be any one of the large number of commercially known anion exchangers such as the following:

| Trade Name | Type | Manufacturer and Location |
|---|---|---|
| Amberlite IR-4B | Polyamine formaldehyde-diamine condensation polymer. | Rohm & Haas Company, Philadelphia, Pa. |
| Anex 299 | Guanidine resin | Infilco Inc., Chicago, Ill. |
| De-Acidite | Aliphatic amine type resin. | The Permutit Company, New York, N. Y. |
| Ionac A-293-M | Melamine guanidine formaldehyde. | American Cyanamid Co., New York, N. Y. |
| Liquonex AF | Polyalkylene polyamine resin. | Liquid Conditioning Corp., Linden, New Jersey. |

It is desirable that the resins be in rather fine particle form and they should be activated after reduced to this form to give a maximum active surface area. The carbon powder and the resin particles or powder are intimately admixed in a suitable proportion to extend the carbon electrode through local action between the particles. Normally, the carbon particles should constitute not more than 40 per cent of the volume of the resin particles. It has been found that the incorporation of the carbon particles will increase the available amperage in the cells to a considerable extent.

The material for forming the cell wall can be any permeable container which will not be attacked by either the salt solution surrounding the cell or by the ingredients in the cell. A seamless regenerated cellulose tubing such as "Visking" dialysis tubing has been found to be satisfactory. This tubing is made by the Visking corporation of Chicago. It has the ability to accommodate passage of low molecular weight compounds in aqueous solution while refusing passage of the higher molecular weight materials. It should be understood, however, that any ionically permeable container is satisfactory and that rigid walled containers such as unglazed porcelain cups can be used.

The positive cell is filled with a concentrated, soluble, metallic hydroxide having an anion which is as high as possible in the electromotive force series of elements and is, therefore, considered the most electropositive.

The negative cell is filled with a concentrated, soluble acid, the cation of which is as low as possible in the electromotive force series of elements and is, therefore, very electronegative.

As indicated, the negative and positive cells are immersed in a concentrated solution containing the salt of the positive cell anion and the negative cell cation. Suitable combinations of acids, hydroxides, and salts for the battery are illustrated in the following table:

| Positive Cell Hydroxide | Negative Cell Acid | Immersion Salt Solution |
|---|---|---|
| KOH—Potassium Hydroxide. | HCl—Hydrochloric Acid. | KCl—Potassium Chloride. |
| LiOH—Lithium Hydroxide. | HBr—Hydrobromic Acid. | LiBr—Lithium Bromide. |
| Ba(OH)$_2$—Barium Hydroxide. | HI—Hydriodic Acid. | BaI$_2$—Barium Iodide. |
| NaOH—Sodium Hydroxide. | HF—Hydrofluoric Acid. | NaF—Sodium Fluoride. |

It is possible to use any hydroxide of column 1 with any acid of column 2 and to use the resulting salt in the immersion solution.

The container 13 can be composed of any nonconducting material which is inert to the container ingredients. Plastics, glass, rubber, and the like, are operative.

In operation of the battery 10, positive ions are selectively adsorbed on the resin contained in the positive cell 11 and the negative ions are selectively adsorbed on the resin in the negative cell 12. The adsorption of these ions causes an electrical unbalance or disequilibrium in the system thus creating a potential difference between the two cells resulting in a source of electrical current. The cell containers 17 and 24 will confine the resins and the electrodes but will allow free movement of the ions throughout the battery under conditions of charge and discharge. The two-cell battery of Figure 1 will deliver about 2½ volts and will have available current of about ¼ ampere. When the ion exchange resins are deactivated after use of the battery, they can be regenerated by an ordinary electrical generator for a storage battery. This will cause the reverse flow of ions and will result in a reactivation of the surfaces of the resins. If any gases are generated during charging the same can be vented through the bores in the carbon electrodes.

Since the battery is free from any metal parts and contains only materials which are chemically inert to the active ingredients of the battery, the battery will have a prolonged wear life.

In the battery 10 illustrated at 10a in Figure 2, the cell 11a has the same container 17 and is immersed in the same electrolyte 29 as the cell 11 in the battery 10. However, the cell 11a has the carbon electrode 14 thereof equipped with a series of radial carbon disks 31 and the particles of resin 15 are disposed between these disks. In this arrangement, the graphite particles 16 may be dispensed with since the disks 31 will extend to the active surface of the electrode 14 and will increase the available potential of the cell. As illustrated, the cell 17 has a flap valve 32 on the top thereof to serve as a vent. In this arrangement the electrode 14 need not be drilled. The vent 32 will, of course, be above the liquid level 29.

Figure 3 shows a battery 10b composed of three positive cells such as 11 or 11a and three negative cells such as 12. As therein illustrated, negative cells 12 are positioned adjacent positive cells 11 in the same container 33 divided into three separate compartments like an automobile storage battery with each compartment containing a common salt solution and the respective electrodes of intermediate cells are connected in a series to provide opposite poles 14 and 22 at the diagonal opposite corners of the container 33. A plug 30 is provided for each compartment filling the same with salt solution.

In the battery 10c, of Figures 4 and 5, flat plate-like positive and negative cells are stacked in a container. As therein illustrated, a container 35 houses the salt solution electrolyte 36 and is filled from a vented plug 37 in the top wall 35a thereof. A stack of positive and negative cells in alternating superimposed relation is immersed in the salt solution 36.

A positive cell 38, in the illustrated embodiment of Figures 4 and 5, forms the bottommost cell in the stack and a negative cell 39 is superimposed thereover. Identical positive and negative cells 38 and 39 then complete the rest of the stack in alternating relation to each other. The positive cells 38 are composed of a plate-like carbon electrode 40 surrounded by one of the aforementioned cation exchange resins in the form of particles 41. If desired, finely divided carbon or graphite particles 42 can be interspersed in the resin particles. A chemically inert ionically permeable bag 43, such as "Visking," surrounds the plate 40 and the particles 41 and 42 and is tied closed around one end portion of the plate 40 as at 44. As shown, the end portion of the electrode 40 is reduced at 40a and projects through the bag 43.

The negative cells 39 are composed of flat plate-like carbon electrodes 45 surrounded by anion exchange resins of the type indicated above in the form of particles 46 and these particles can be interspersed with carbon or the like, 47. A chemically inert ion permeable bag 48 surrounds the particles and plate electrode and is tied closed at 49 around the reduced end 45a of the electrode 45. It should be noted that this reduced end 45a is opposite the reduced end 40a of the electrode 40 in the positive cell.

As shown in Figure 5, the reduced ends of the carbon plate electrodes 40a and 45a are apertured and receive a pole member such as a carbon rod 50 and 51 respectively therethrough. The pole 50 is thus intimately connected with all of the carbon electrodes 40 in the positive cells while the pole 51 is intimately connected with all of the electrodes 45 in the negative cells. The poles 50 and 51 extend through the top wall 35a of the container 35 to form respectively the negative and positive poles of the battery. The stacking of the cells in the single salt bath and the connecting of all of the respective positive and negative cells in parallel increases the amperage capacity of the battery. The two-pole battery of Figures 4 and 5 will deliver a much higher amperage than the series battery arrangement of Figure 3 but the potential of this two-pole battery will only be about 2½ volts.

The bags 43 and 48 housing the positive and negative cells 38 and 39 are in the form of flattened plate-like members to surround the plate-like electrodes and a good distribution of ion exchange particles around the electrodes is thereby obtained. The bags can expand to accommodate gassing in the event the battery is recharged at a too rapid rate and if desired, the bags can be equipped with vent devices such as, for example, the flap valve 32 illustrated in Figure 2.

Of course, if desired, the pole pieces 50 and 51 can be formed of a metal that is inert to the action of the salt solution 36 or metal protected from the solution by a protective coating such as polystyrene K resins or other plastic. Obviously, the cells 38 and 39 will contain the hydroxide and acid specified hereinabove in connection with the batteries of Figures 1 to 3.

From the above description it will, therefore, be understood that this invention provides a storage battery or accumulator where positive ions are selectively adsorbed on a resin contained in a positive cell and negative ions are selectively adsorbed in a resin contained in a negative cell.

It will be understood that modifications and variations may be effected without departing from the scope of the novel concepts of the present invention.

I claim as my invention:

1. An accumulator comprising a container, a salt solution in said container, positive and negative cells immersed in said salt solution, said positive cell having an electrode surrounded by a cation exchange resin and an ion permeable container housing the resin, said negative cell comprising an electrode, an anion exchange resin surrounding the electrode and an ion permeable container housing the resin, a solution having a hydroxyl ion in said positive cell, a solution having a hydrogen ion in said negative cell, and said salt solution in said container containing the salt of the positive cell anion and the negative cell cation.

2. A storage battery which comprises a container, a salt solution in said container, ion permeable cell housings immersed in said solution, one of said cell housings containing a carbon electrode, a cation exchange resin, and a hydroxide solution, the other of said cell housings containing a carbon electrode, a cation exchange resin, and an acid, said electrodes projecting from said cells and forming poles for said battery, and said salt solution in the container including a salt having the hydroxide anion and the acid cation.

3. A storage battery which comprises a positive cell having a central carbon electrode surrounded by a sulfonated polystyrene divinyl benzene copolymer cation exchange resin containing finely divided carbon mixed therein, a regenerated cellulose container enclosing said resin and electrode, a concentrated metallic hydroxide solution filling said container, a negative cell composed of a central carbon electrode surrounded by a polyamine formaldehyde-diamine condensation polymer anion exchange resin having carbon admixed therein, a regenerated cellulose housing confining said resin and electrode, a concentrated acid solution filling said negative cell, and a concentrated salt solution surrounding said positive and negative cells and containing the metal of the hydroxide in the positive cell and the cation of the acid in the negative cell, said metal hydroxide having an anion high in the electropositive side of the electromotive force series of elements, and said acid having a cation low in the electronegative side of said electromotive force series of elements, and said electrodes forming poles for said battery.

4. A storage battery which comprises a container, a salt solution in said container, a plurality of cells in said salt solution, each of said cells having an ion permeable container, an ion exchange resin therein and a carbon electrode surrounded by the resin, some of said cells having an anion exchange resin and other of said cells having a cation exchange resin, means venting said cells to the atmosphere, the anion exchange resin containing cells having a concentrated soluble acid therein, the cation exchange resin containing cells having a concentrated soluble metallic hydroxide therein, and said salt solution surrounding the cells having an anion common to the hydroxide and a cation common to the acid.

5. An ion exchange storage battery which comprises a container having a salt solution selected from the class consisting of potassium chloride, lithium bromide, barium iodide and sodium fluoride, positive and negative cells immersed in said salt solution and each containing ion exchange resins, carbon electrodes, and an ion permeable container, some of said cells having an anion exchange resin and a solution of acid therein, other of said cells having a cation exchange resin and a hydroxide solution therein, said acid solution selected from the group consisting of hydrochloric acid, hydrobromic acid, hydriodic acid, and hydrofluoric acid, said hydroxide solution selected from the group consisting of potassium hydroxide, lithium hydroxide, barium hydroxide, and sodium hydroxide, and said salt solution containing the cation of the acid and the anion of the hydroxide.

6. A storage battery which comprises a container housing a salt solution, regenerated cellulose bags immersed in said salt solution, and each containing an electrode and an ion exchange resin, some of said bags having a cation exchange resin with a metal hydroxide filling the bag, other of said bags having an anion exchange resin with an acid filling the bag, said hydroxide and said acid respectively containing the anion and cation of the salt solution, means venting the bags to the atmosphere, and means connected to said electrodes for forming the battery poles.

7. A storage battery which comprises a multi-compartment container, a salt solution in each compartment of said container, a pair of cells immersed in said salt solution of each compartment, each of said cells including ion permeable housings containing an ion exchange resin and a carbon electrode, one of said cells in each compartment having a cation exchange resin with a metal hydroxide solution immersing the resin and electrode, the other of said cells in each compartment containing an anion exchange resin with a concentrated acid solution immersing said resin and electrode, means connecting the hydroxide-containing cells in series with the acid-containing cells, and said salt solution having the anion of the hydroxide and the cation of the acid.

8. A storage battery which comprises a container, a salt solution in said container, a stack of cells in said salt solution, each of said cells having an ion permeable housing, an ion exchange resin in the housing and an electrode surrounded by the resin, some of said cells containing an acid and an anion exchange resin, other of said cells containing a hydroxide and a cation exchange resin, and means connecting said electrode to form the poles for the battery.

9. A storage battery which comprises a casing, a salt solution in said casing, a stack of cells in said salt solution, alternate cells having electrodes projecting from opposite ends thereof and having cation exchange and anion exchange resins respectively therein, said alternate cells including an acid solution and an alkaline solution immersing the anion exchange resin and the cation exchange resin respectively, and a battery pole connecting all of the electrodes of the anion exchange resin cells and a second battery pole connecting all of the electrodes of the cation exchange resin containing cells, said acid and said hydroxide having ions in common with the salt solution.

10. A storage battery cell which comprises a bag of regenerated cellulose, a carbon electrode in said bag and projecting therefrom, an ion exchange resin in said bag surrounding said carbon electrode, and means coacting with said electrode to extend the effective surface thereof throughout the resin.

11. A storage battery comprising a container, an electrolyte in said container, positive and negative cells immersed in said electrolyte, said positive cell having an electrode, a cation exchange resin in contact with said electrode and an ion permeable container housing the resin, said negative cell comprising an electrode, an anion exchange resin contacting the electrode and an ion permeable container housing the resin, means having a negative ion in said positive cell, means having a positive ion in said negative cell, and said battery producing electric current through the action of said resins on the ion-furnishing means in the cells and being regenerated by imput of electric current through the action of the ion-furnishing means on said resins.

12. A storage battery free from oxidation and reduction reactions which comprises a container, an electrolyte in said container, ion permeable cell housings immersed in said electrolyte, one of said cell housings containing an electrode, an exchange resin and a negative ion-furnishing fluid, the other of said cell housings containing an electrode, an exchange resin, and a positive ion-furnishing fluid, said electrodes forming poles for said battery and said battery producing electric current through the action of said exchange resins on the ion-furnishing fluids in the cells and being regenerated by the action of the ion-furnishing fluids on the resins when said poles are subjected to the imput of electric current.

References Cited in the file of this patent

UNITED STATES PATENTS

| Number | Name | Date |
|---|---|---|
| 2,607,809 | Pitzer | Aug. 19, 1952 |
| 2,636,851 | Juda et al. | Apr. 28, 1953 |